US006182169B1

(12) United States Patent
Force, Sr. et al.

(10) Patent No.: US 6,182,169 B1
(45) Date of Patent: Jan. 30, 2001

(54) TETHER FASTENED TO PERSONAL DIGITAL ASSISTANT BY LATCH HAVING SPRING BIASED MANUAL TOGGLE

(76) Inventors: Gordon F. Force, Sr., 1128 Amur Creek Ct., San Jose, CA (US) 95120-4103; Karl L. Herbst, 23494 Sunset Dr. Los Gatos, Los Gatos, CA (US) 95030

( * ) Notice: Under 35 U.S.C. 154(b), the term of this patent shall be extended for 0 days.

(21) Appl. No.: 09/187,152

(22) Filed: Nov. 6, 1998

(51) Int. Cl.[7] ..................................................... G06F 1/16
(52) U.S. Cl. .......................... 710/62; 361/683; 361/686; 224/219
(58) Field of Search .................................. 361/683, 686; 439/345; 710/62; 224/219

(56) References Cited

U.S. PATENT DOCUMENTS

| D. 397,679 | * | 9/1998 | Hawkins et al. | D14/100 |
|---|---|---|---|---|
| 5,030,128 | * | 7/1991 | Herron et al. | 439/372 |
| 5,751,546 | * | 5/1998 | Clark et al. | 361/686 |
| 5,898,647 | * | 4/1999 | Goradesky | 368/83 |
| 6,065,880 | * | 5/2000 | Thompson | 385/88 |
| 6,101,086 | * | 8/2000 | Kim et al. | 361/683 |

* cited by examiner

Primary Examiner—Thomas C. Lee
Assistant Examiner—Albert Wang
(74) Attorney, Agent, or Firm—David E. Newhouse

(57) ABSTRACT

A lanyard, tether or leash is secured to a PERSONAL DIGITAL ASSISTANT device (PDA) by a tether latch receiving and positively latching onto a "plug-in" or docking base of typical PDA. The body of the tether latch defines a socket with a mating curvilinear circumferential lip for snugly receiving the PDA docking base with a stationary catch nib being received in a latch notch on one side of the PDA docking base. A toggle coupled to the latch body manually translates carrying a catch nib into and out of the corresponding latch notch on the opposite side of the PDA docking base. A spring compressed between the latch housing and the toggle positively biases the latch 'normally latched.' A tether, lanyard, leash strap or cord is fastened between a tether hole through a tab on the latch body and the neck, the wrist; belt or clothing of a user to prevent the PDA from striking ground when fumbled or inadvertently dropped by the user.

9 Claims, 7 Drawing Sheets

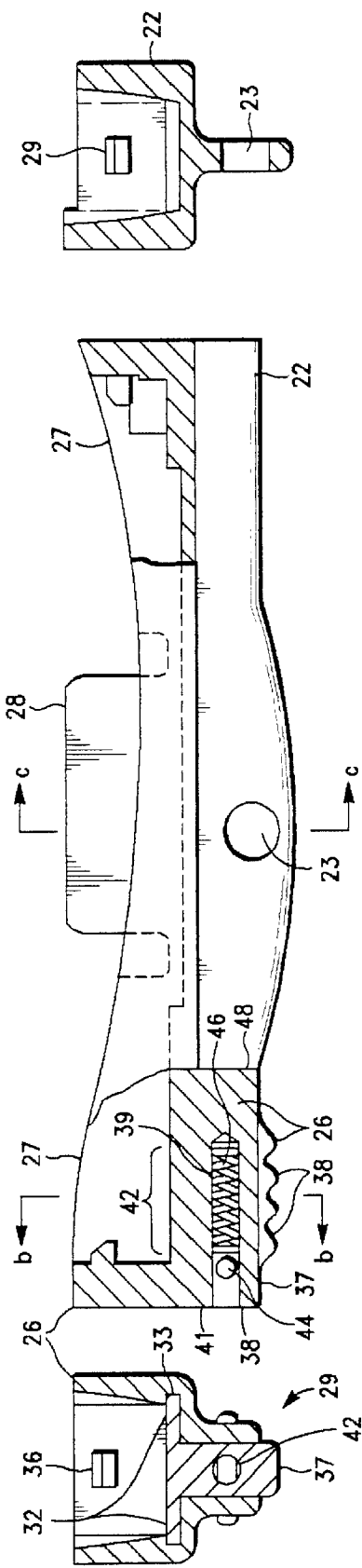

TETHER FASTENED TO PERSONAL DIGITAL ASSISTANT BY LATCH HAVING SPRING BIASED MANUAL TOGGLE

BACKGROUND OF THE INVENTION

3COM Corporation manufactures and markets a line of shirt pocket (palm) sized personal digital assistants (PDAs), i.e., hand held digital electronic note taking and record keeping computers known as Palm Computing® Connected Organizers, i.e., the PalmPilot® and the Palm III™ Organizers. Details of PDAs manufactured for and sold by the 3COM Corporation are published on and can be accessed via the Internet IBM® has manufactured and sells an identical line of PDAs under license from 3COM Corporation known as the Workpad. Details of the IBM® WorkPad PDAs are published on and can be accessed via the Internet.

More than 2 million PalmPilot® Palm III™ and Workpad PDA Organizers have been sold in the past few years. Typically, such users carry such small PDAs in their shirt pocket. Frequently, protective carrying cases or shells are used to protect the PDAs from shock and scratches. Unfortunately, most PDAs include a flat panel glass (LCD) display screen which is quite fragile. Typically such screens shatter when the PDA is fumbled and dropped at typical working heights (3 to 5 feet) onto hard floor surfaces (concrete) and the like. Also the thin hard plastic body case of the PDA has a tendency to chip and fracture when dropped onto hard surfaces.

Fragility limits the utility of small PDAs such the PalmPilot®, the PalmIII™ and the Workpad. For example, in a typical supermarket situation, fishing a PDA out of a pocket or a carrying case to consult a list is a two handed operation, something that is not really feasible for a user simultaneously shopping. Hands full, and attention distracted, shopping users invariably fumble and drop something, typically the PDA they are attempting to fish out of a pocket or case and consult. A PDA with a shattered LCD panel and/or fractured case is a broken PDA and useless. All recent data and information entered and stored is typically lost. PDA data backed-up (saved) in another computer data storage system is typically never current.

Similar confounding environments challenge PDA users wanting to consult their PDAs, while standing conversing (and gesticulating) with associates; while riding a bicycle; while doing aerobic exercises; while driving searching for an address; while riding a horse; while hiking.

One of the unique attributes of the 3Com Corporation line of Palm Computing® Connected Organizers and the Workpad PC IBM® is that the base of the PDA case is configured to "plug-in" or dock in female sockets of mounting cradles and circuitry modules each of which may contain external electronic processing elements. Typically, mounting cradles include a pedestal base which support the PDA in an inclined position on a horizontal support surface while simultaneously electrically coupling the PDA to external electronics, e.g., a battery charger and/or external computer system. The back face of the docking base of Palm Computing® Connected Organizers and clones feature a plurality (10) centrally positioned adjacent conductive strips positioned between a pair of raised lands aligned parallel the side edges of the casing for allowing 'wiping' electrical contact between the PDA and the female/cradle electronics elements. Latch notches (recesses) are located proximate end of the docking base of the PDA casing which penetrate into its side edges for receiving complementary shaped male latching nibs of the enveloping female module/cradle socket.

A rather frustrating aspect of such modules/cradles docks is that mechanisms securing the module and cradles to the PDA are typically designed to secure the circuitry module/cradle to the PDA not visa versa. In fact, mounting cradles typically rely upon gravity (a force field) to maintain engagement of the PDA in the cradle mount. Accordingly, when handling a PDA coupled to a female circuitry module or a cradled PDA, users must exercise caution to avoid flipping the PDA free of the connecting module or cradle to crash on the floor.

SUMMARY OF THE INVENTION

A lanyard, tether or leash is secured to a PDA device by a tether latch receiving and positively latching onto a "plug-in" or docking base of typical PDA Palm Computing® Connected Organizers and clones. The body of the tether latch defines a socket with a mating curvilinear circumferential lip for snugly receiving the PDA docking base with a stationary catch nib being received in a latch notch on one side edge of the PDA docking base. A toggle coupled to the latch body manually translates carrying a catch nib into and out of the corresponding latch notch on the opposite side edge of the PDA docking base. A spring is compressed between the latch housing and the toggle positively biasing it 'normally latched.' A tether, lanyard or leash strap or cord is fastened between a tether hole through a tab on the latch body and the neck, the wrist; belt or clothing of the user to prevent the PDA from striking ground when fumbled or inadvertently dropped by the user.

A primary novel aspect of the invented PDA tether and latch relates to a compression spring element biasing the toggle 'normally latched' which must be further compressed manually for coupling and de-coupling the latch housing from the base of the PDA by manually translating the toggle carrying one catch nib outward. The cross section configuration of the PDA docking base and receiving socket of the invented tether latch mechanically preclude relative translation tending to disengage the toggle biased 'normally latched.'

Another novel aspect of the invented PDA leash and latch relates to a planer tongue element protruding from the latch housing for registering with and fitting between the raised lands of the PDA casing when the housing is latched onto the PDA shielding and protecting the conductive strips between the lands. In particular, the planer tongue is shaped to allow the latch housing to rotate into latched engagement with the docking base of the PDA. The tongue also serves to mechanically preclude relative sideways translation of the PDA and invented tether latch when fastened together. The tongue may also serve as a mounting substrate for 'wiping' electrode connectors for electrically connecting electronic elements within the latch housing, if any, to the PDA electronic processing elements when the invented tether latch is fastened to the PDA.

Still other aspects of the of the invented PDA tether latch is a double loop segmented tether with a positive side compression release buckle securing the respective loop segments together enabling a user to handily decouple the PDA leashed to him or herself for third party examination without disengaging the tether latch while simultaneously providing additional security of a wrist loop strap/cord for holding onto the PDA.

BRIEF DESCRIPTION OF THE DRAWINGS

FIGS. 5a, 5b & 5c present cross section views of the invented tether latch depicted in FIGS. 2a 2b, 3a & 3b.

DESCRIPTION OF PREFERRED AND EXEMPLARY EMBODIMENTS

Figure 1:
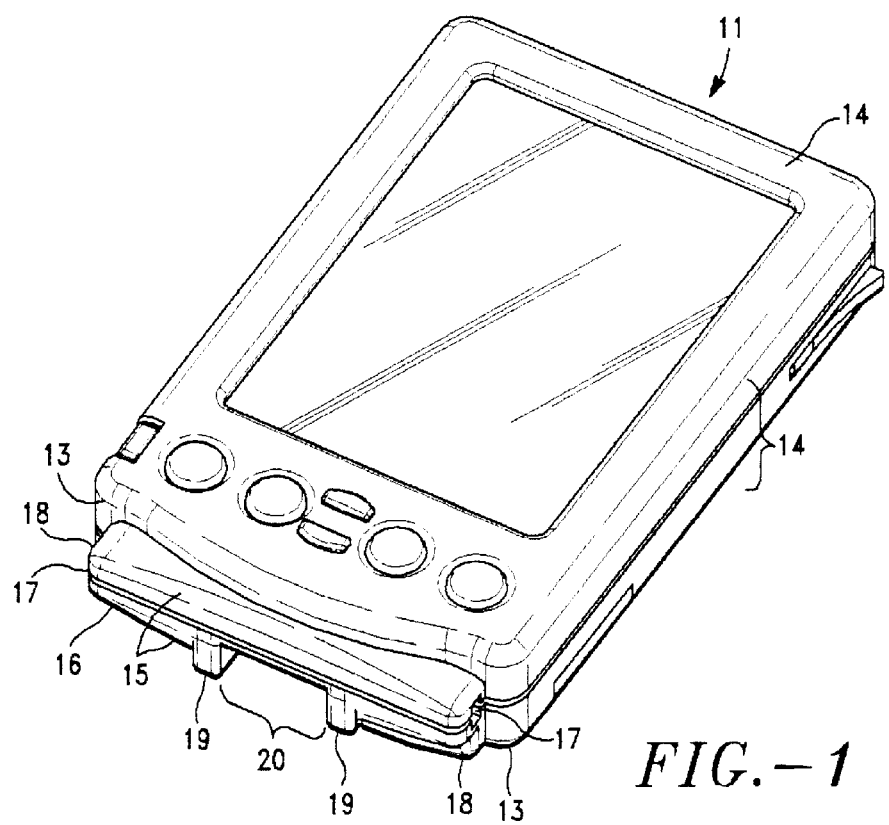
FIG. 1 shows a perspective view of the 'plug-in' or docking base of a Palm Pilot® Computing Organizer PDA.
Figure 2:
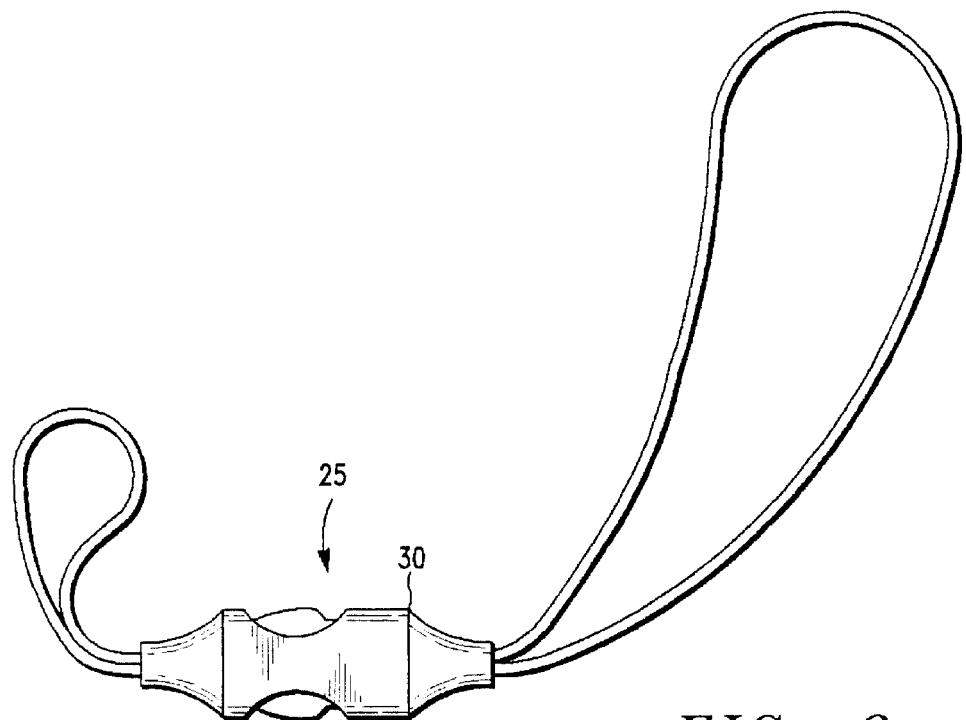
FIG. 2 shows a conventional double loop segmented tether with a standard side release buckle coupling the two loops.
Figure 2A:
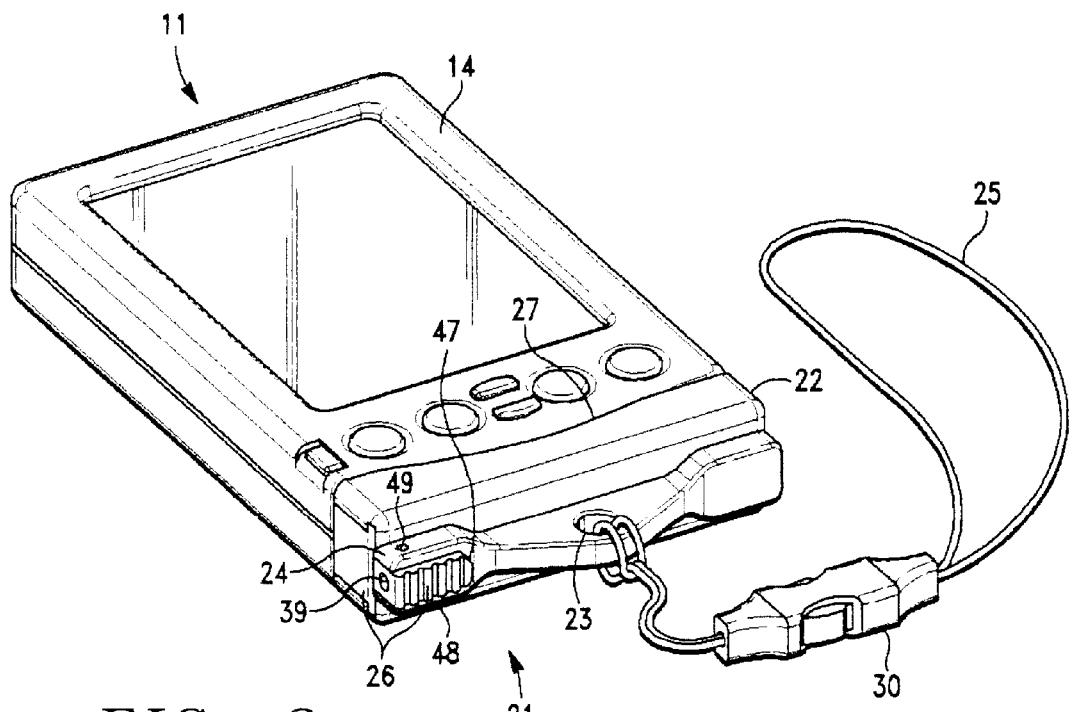
FIGS. 2a & 2b show front and back perspective views of a Palm Pilot® Computing Organizer coupled with the invented tether latch.
Figure 2B:
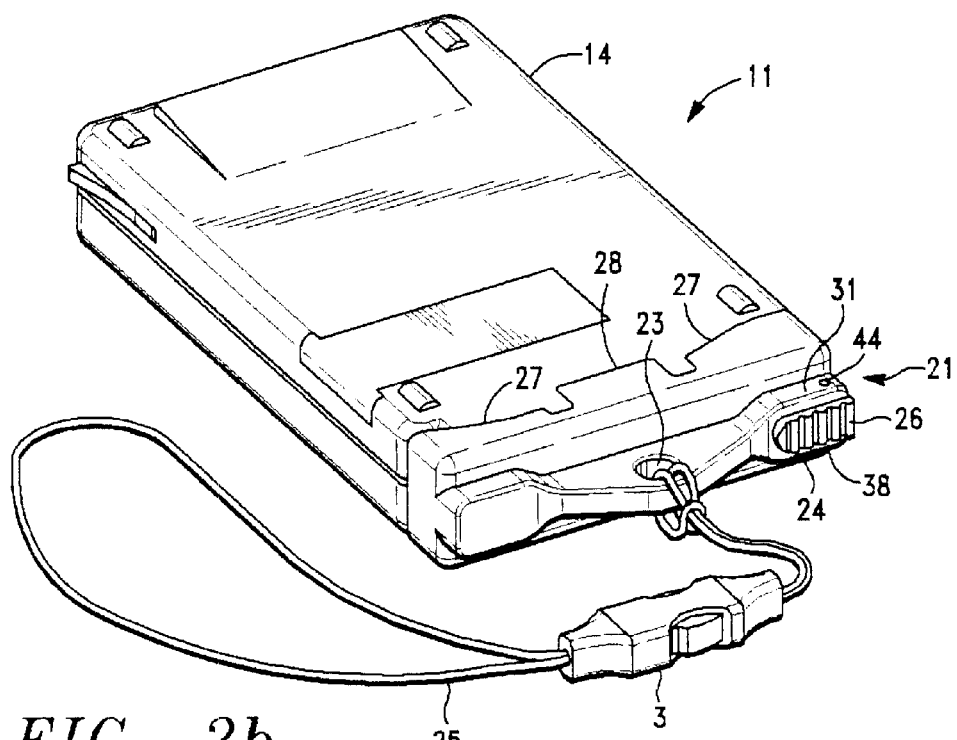
Figure 3A:
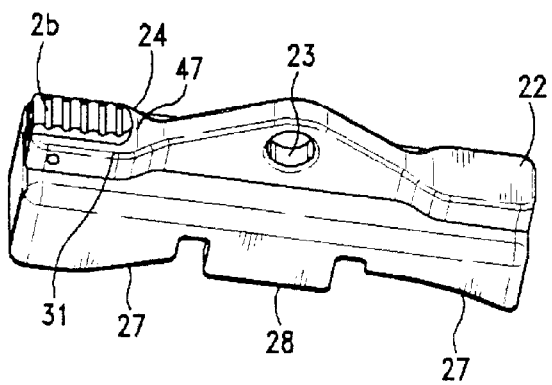
FIGS. 3a & 3b show an exterior and an interior perspective view of the invented tether latch shown in FIGS. 2a & 2b, respectively.
Figure 3B:
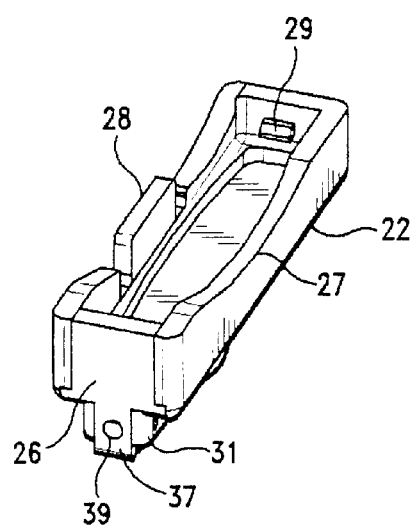
Figure 4:
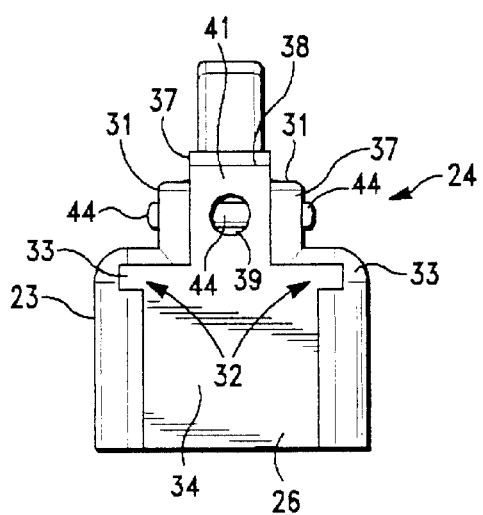
FIG. 4 show and end external view of the toggle received within the yoke of the invented tether and latch depicted in FIGS. 2a & 2b.

Looking at FIG. 1, an early Palm Computing® Connected Organizer, known as the PalmPilot® 11 includes a clam shell type casing defining a molded circumferential curvilinear shoulder seating surface 13 co-dimensional with the PDA case 14 integral with and surrounding a dimensionally smaller convex hexahedral male 'plug-in' or docking base 16 having convex side faces 15 and latch notches 17 recessed into opposite side edges 18. [See U.S. Pat. No. Des. 397,679] The Palm III Connected Organizer model is thinner than its predecessor, and has a clam shell type casing which tapers smoothly to the docking end dimensions eliminating the molded curvilinear shoulder seating surface. Both the early and newer models of the Palm Computing® Connected Organizer present raised lands or shoulders 19 defining a connection slot 20 on either side of a plurality of parallel conductive connection strips (not shown) on the back face of the docking base 16 which function to aligned and properly orient the PDA connection strips with wiping type electrical connectors of a receiving socket plug of a circuitry module or cradle (not shown). In particular, the lands 19 prevent wrong way insertion of the PDA into a receiving socket.

Looking at FIGS. 2a, 2b, 3a, 3b, 4a, & 4b, the invented tether latch 21 fastens to the docking base 16 of the PDA case 14, and includes a solid latch body 22 machined from a solid structural stock such as Aluminum. The latch body 22 includes an exterior tab with a tether hole 23 oriented perpendicularly relative to the principal plane of the PDA 11, and a yoke 24 confining and carrying a translating toggle 26. A loop segment of a conventional double loop segment tether 25 with a standard side release buckle 30 securing the respective loops together is conventionally looped through the tether hole 23. The interior of the latch body 22 is machined, (hollowed out) forming an open end socket with a convex cross section conformed to receive and seat the docking base 16 (FIG. 1) of the PDA case 14.

As shown in FIGS. 2a 2b, 3a & 3b, the latch body provides a mating curvilinear circumferential lip 27 conforming to the curvilinear shoulder seating surface 13 of the PDA case 14 including an integral tongue 28 extending between the raised lands 19 into the connection slot 20 above the conductive connection strips. [See U.S. Pat. No. Des. .397,679, FIG. 7]. The latch body 22 also includes a stationary catch nib 29 located and shaped for insertion into a latch notch 17 recessed into a side edge 18 of the PDA docking base 16.

FIGS. 4 and 5a–c show details the toggle 26 received and translating between extending yoke arms 31 of the yoke 24. In particular, tracking lands 32 extend in a common plane on either side of the toggle 26 and are received in slot lands 33 cut into the interior sides of the yoke arms 31. An integral tongue 34 extends out from the plane of the tracking lands 32 between the yoke arms 33 closing the open end of the latch body 22 completing the circumferential socket receiving the PDA docking base 16. The tongue has an inwardly projecting catch nib 36 appropriately located and shaped to be received in the latch notch 17 on the opposite side edge 18 of the PDA docking base 16 when it is seated in the receiving socket of the tether latch 21. An integral hexahedral thumb knob 37 with a knurled top surface 38 extends oppositely the tongue 34 from the plane of the tracking lands 32 between the yoke arms 33 to a point above the top of such yoke arms to provide a means for manually translating the toggle relative to the latch body 22 with a thumb or finger. A cylindrical spring cup 39 is drilled into the front face 41 of the thumb knob 37 parallel the tracking lands 32. A translation slot 42 cut through the sides of the thumb knob 37 perpendicularly intersects the cylindrical spring cup 39. A retaining pin 44 is anchored between the yoke arms 31 proximate their tips and extends through the translation slot 42 of the thumb knob 37.

A spring 46 is compressed between the retaining pin 44 and the bottom of the spring cup 39. The compressed spring 46 urges (biases) the toggle 26 to translate inwardly between the yoke arms 31 defining a 'normally latched' condition with the back face 48 of the thumb knob seated at the base 47 of the yoke 24. As shown, in the 'normally latched' position, the front face of the thumb knob 41 is coplanar with the tips of the yoke arms 31 and the tongue 34 depending oppositely from the plane of the tracking lands 32 defines the end lip of the socket receiving the PDA docking base 16.

When the invented tether latch is secured to the PDA docking base 16, the catch nibs 29 and 36 at the opposite ends of the tether latch 26 are received in the latch notches 17 on the opposite side edges 18 of the PDA docking base 16. The skilled designer should appreciate that: (i) the convex cross section of the PDA docking base 16 [See U.S. Pat. No. Des. 397,697, FIG. 5], (ii) the enveloping mating convex cross section of the receiving tether latch socket; and (iii) the extending tongue 28 of the latch body 22 received between the shoulders 19 defining a connection slot 20 of the PDA docking base 16, cooperate mechanically to preclude relative (sideways) mechanical translation of the PDA within the socket of the tether latch 21. Accordingly, the latched components translate in the same direction, relative to each other, as the toggle 26 translates relative to the latch body 22. Accordingly, when fastened together, forces tending translate the tether latch 21 and PDA 11 oppositely in the principal plane of the PDA can not load (further compress), spring 46. Thus, engagement of the catch nib 36 in the particular PDA latch notch 17 is maintained. In other words the mechanical configuration of the docking base 16 and receiving socket of the tether latch 21 preclude sideways translations that could disengage the respective components.

The toggle 26 can only be manually translated outward relative to the yoke 24 against the bias of the compressed spring 46 compressing it further. With normal helical compression springs, this limitation means that it is essentially mechanically impossible to deform (strain) the spring causing a loss of elasticity and/or degradation of its biasing expansion force. Also because the spring is compressed between the retaining pin 44 anchored by the yoke 24 of the latch body 22 and bottom of the spring cup 39 of the toggling element 26, it also mechanical stops the toggle 26 from sliding free (out of the slot tracks 33) of the latch body 22.

To fasten the invented tether latch to the PDA 11, the toggle is manually translated outward with a thumb or finger and held so that the catch nib 36 projecting inwardly from the tongue 34 clears the end corner of the PDA docking base 16 allowing the PDA 11 and tether latch to rotated relatively, in the principal plane of the PDA, pivoting on the latch catch nib 29 at the opposite end of the tether latch received/inserted in the latch notch 17 on the opposite the side edge 18 of the PDA docking base 16. When the PDA docking base 16 is fully pivoted into the socket of the tether latch 26, biased by the compressed spring 46, the toggle 26 is released and translates inward, snapping or thrusting the catch nib 36 into the latch notch 17 in the corresponding side edge 18 of the received PDA docking base 16.

Conversely, to unfasten the PDA and tether latch, the toggle is manually translated outward with a thumb or finger and held moving the catch nib 36 projecting inwardly from the tongue 34 out of the particular latch notch 18 such that, upon relative rotation of the PDA and tether latch in the principal plane of the PDA, the catch nib 36 clears of the end corner of the PDA docking base 16, and the remaining catch nib 29 at the opposite end of the latch can be slipped out of the corresponding latch notch 17 on the opposite side edge 18 of the docking base 16.

Because of machining ease, and aesthetics, in the embodiment illustrated in FIGS. 2a–4b, the exterior face of the tongue 34 and front face 41 of the thumb knob 37 of the toggle 26 are coplanar. Moreover the yoke 24 of the latch body has arms and the toggle is received between the arms.

Figure 6A:
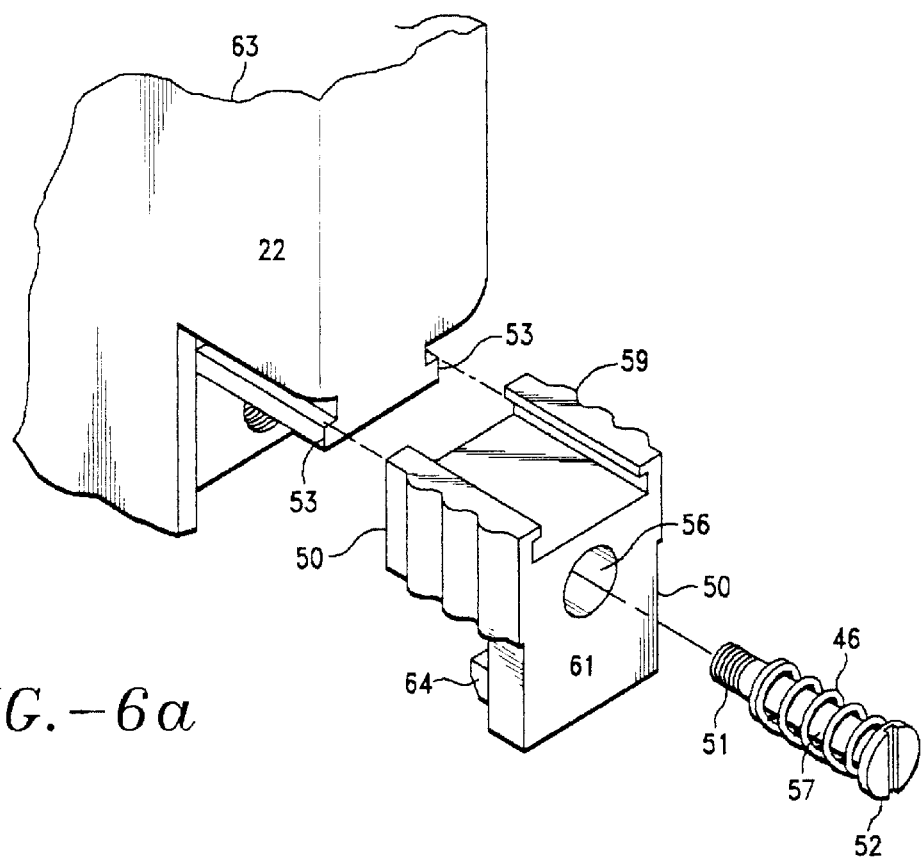
FIGS. 6a, 6b, & 6c; 6d, 6e, & 6f; and 6g, 6h & 6i depict details of alternative configurations of the invented tether latch adapting it for circuitry module housings.

A skilled mechanical designer should recognize that there are many equivalent mechanical structures to those described for accomplishing the design objectives of invented tether latch. For example, FIGS. 6a, . . . 6i, illustrate details of alternative embodiments of the invented tether latch adapted to allow for a circuitry enclosure module 48.

In these latter embodiments, the essential elements of the yoke 24 anchored to or integral with the latch body 22 consist of an extending rod or tongue 51 with a depending perpendicular tang or head 52 at its tip and integral tracking lands 53 oriented parallel the extending rod or tongue 52. The toggle 26 is essentially knob 50 having knurled exterior side faces 54 and reciprocal tracking lands 55 on surfaces adapted for receiving engaging and translating on the tracking lands integral 53 with the latch body 22.

The knob 50 typically includes a spring cup or channel 56 penetrating into its front face. A passageway 57 penetrates from the rear face 58 of the knob 50 into the base of the spring cup or channel 56 adapted respectively to receive or accommodate a rod, or tongue with a tang 52 at its tip. In the case of a rod, the passageway is simply a hole coaxially penetrating through the bottom of the spring cup 55 (FIG. 6 i). In the case of an extending tongue 51 with tang 52 at its tip (FIG. 6 ii) the side faces 54 and rear face of the knob 50 are relieved or cut away to provide sufficient space between the ends of the reciprocal tracking lands 54 and the bottom of the spring channel 55 to accommodate the perpendicular tang 52 at the tip of the extending tongue 51 so that tang 52 is received in the spring channel 55 as the reciprocal tracking lands 54 of the knob 50 slide into receiving engagement translating on the tracking lands 53 of the yoke 24.

Figures 6B, 6C:
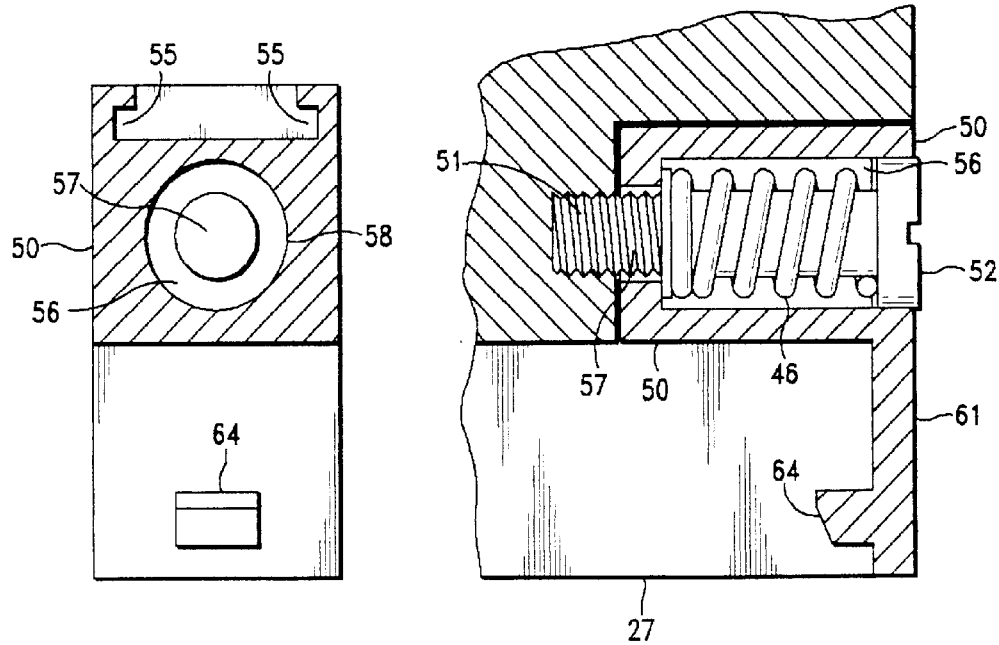
Figure 6D:
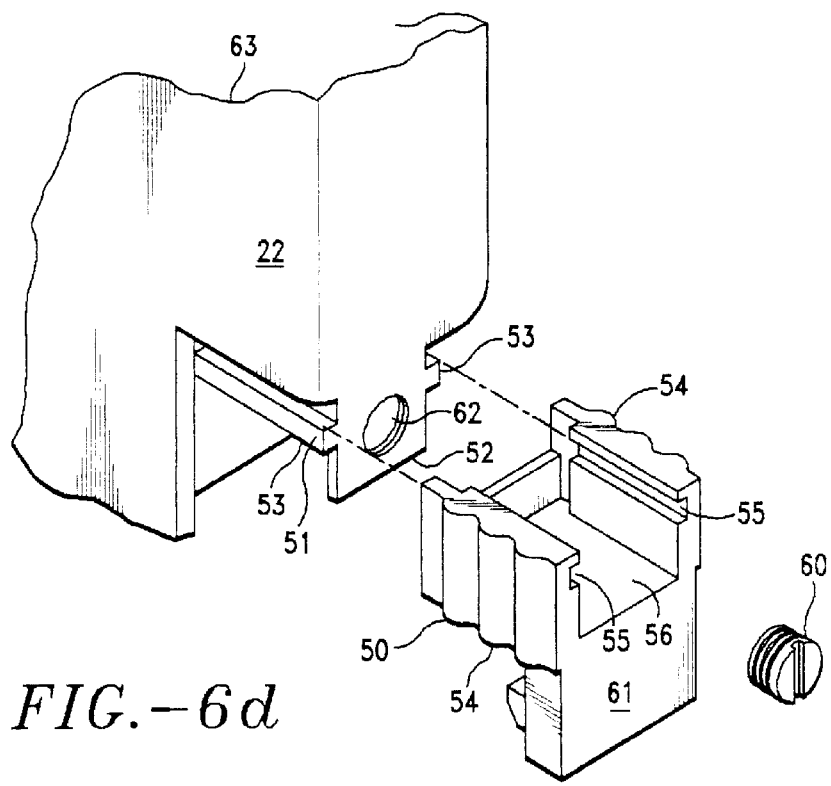

As illustrated, in FIG. 6c, a compression spring 46 is introduced into the spring cup 56 and compressed between the head of the rod and the bottom of the cup 56. The rod is threaded at its distal end and screws into a reciprocally threaded appropriately located socket or hole penetrating into the latch body 22. The diameter of the spring cup 56 is greater than the larger of the diameters of the rod head 52 or the outer diameter of the compression spring 46. In either instance the spring 46 biases the knob to translate inward to seat against the latch body 22

Figures 6E, 6F:
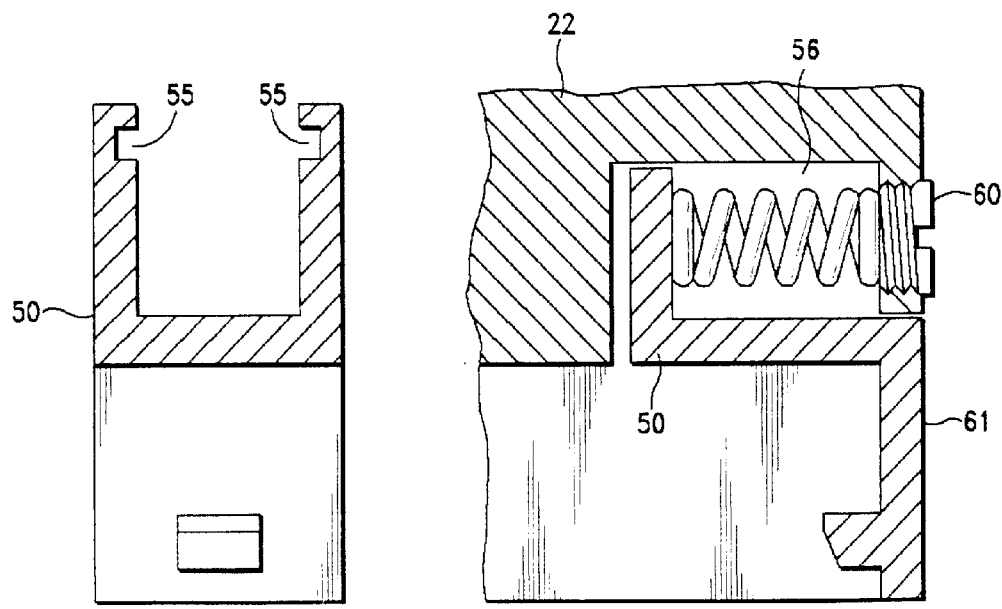
Figure 6G:
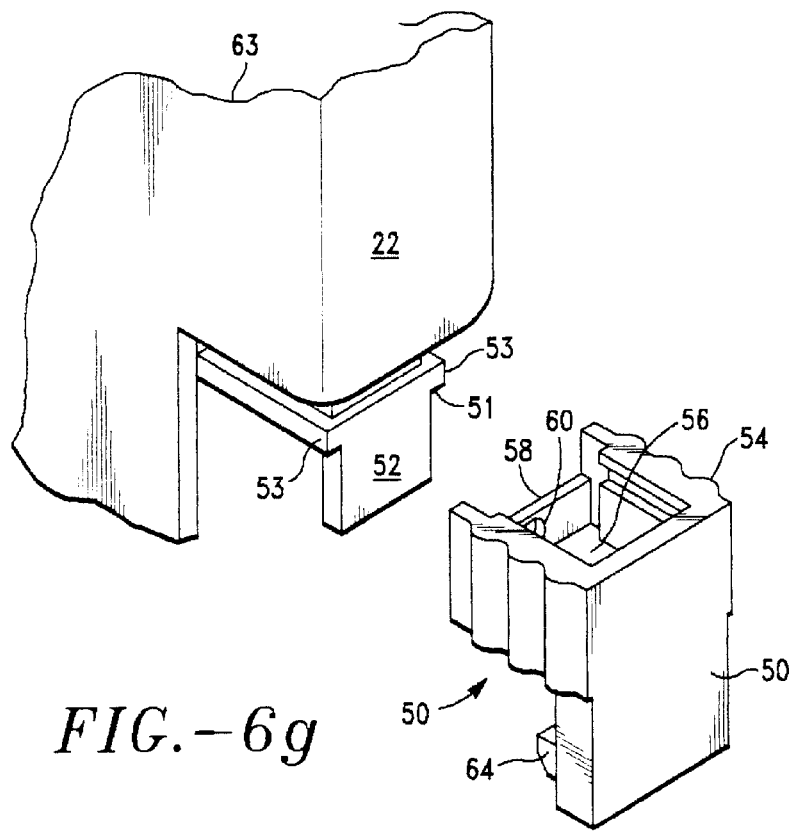
Figures 6H, 6I:
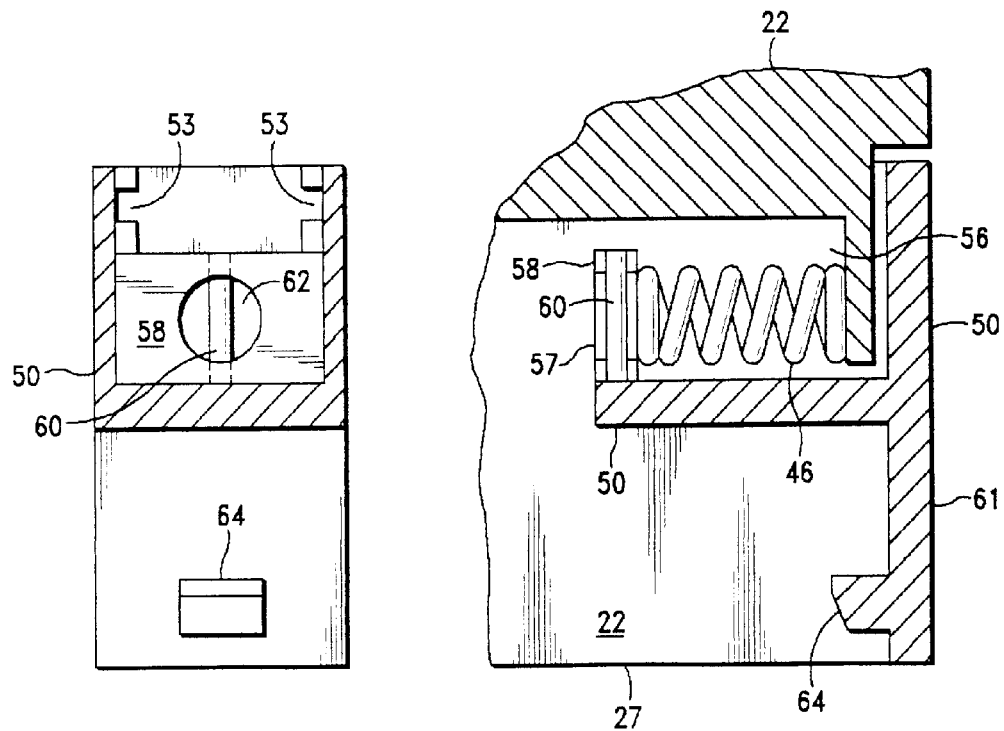

As illustrated in FIGS. 6f & 6i the compression spring 46 is introduced into the spring channel 56 via a spring port 62 penetrating through the tang 52 of back face 58 of the knob 50. Once the spring 46 is introduced into the spring channel 55, and compressed slightly, the spring port 62 through the tang 52 or back face 58 is blocked or closed using a conventional means such as a cross pin or set screw threaded into the port 62. Accordingly, the compressed spring 46 urges (biases) the knob 50 to slide inward onto the tongue 51 and seat against the latch body 22. The length of the compression spring 46 should be chosen such that it completely compresses between the tang 52 and base of the spring channel 56 and mechanically stops outward translation of the knob 50 cantilevered on the tongue 51 and tracking lands 53 before respective tracking lands 53 and 55 disengage.

The front face 61 of the knob 50 extends below the body of the knob and includes an inwardly projecting catch nib 64 located and positioned to snap into the latch notch 17 in the corresponding side edge 18 of the PDA docking base 16 when it is received in the socket defined by the latch body 22. The relieved side faces 53 of the knob 50 may also extend beyond the base spring cup or channel 56. Either the latch body 22 or the circuitry enclosure module 63 includes an exterior tether loop tab with hole 23 to which a conventional tether cord, strap, lanyard or leash can be conventionally fastened.

As with the invented tether latch described with reference to FIGS. 2a–5c, the latch body 22 provides a socket with a mating curvilinear circumferential lip 27 to snugly receive the curvilinear docking surfaces of the particular PDA case including a integral tongue extending between the raised lands 19 defining the PDA connection slot 20. [See U.S. Pat. No. Des. .397,679, FIG. 7]. The skilled designer will appreciated that the integral tongue of the invented tether latch with circuitry enclosure module 48 provides an ideal mounting substrate for securing a complimentary plug sliding into the PDA connection slot 20 for electrically connecting electronic components within the circuitry module 48 to those within the PDA case 14 via the conductive connection strips in the PDA connection socket 20.

The invented the invented PDA tether and latch has been described in context of both representative and preferred embodiments which have reference to shirt pocket (palm) sized PDA note taking and record keeping computers invented developed manufactured and sold for 3COM Corporation and IBM, in particular, the PalmPilot® Organizer the Palm III™ Organizers and the IBM® WorkPad. It should be recognized that skilled engineers and designers can specify different mechanical configurations and shapes for such small PDAs and associated tether latches which cooperate and perform substantially the same function, in substantially the same way to achieve substantially the same result as those cooperating components described and specified in this specification. For example, there are many different shapes for PDAs with docking base ends Accordingly, while mechanical components suitable for such differently shaped PDA docking bases are not exactly described herein, they will fall within the spirit and the scope of invention as described and set forth in the appended claims

We claim:

1. A tether and latch for a shirt pocket (palm) sized note taking and record keeping Personal Digital Assistant computer (PDA) having a docking base with latching notches recessed into opposite side edges and configured for seating within female sockets of external mounting cradles and circuitry modules, comprising in combination:
   a) a latch body providing,
      (i) a socket for snugly receiving curvilinear docking surfaces of the docking base of the PDA having a mating curvilinear circumferential lip with a fitting gap and a fixed catch nib projecting inwardly at a location within the socket opposite the gap located for seating into a latching notch in a side edge of the docking base,
      (ii) a yoke above the fitting gap in the circumferential lip; and
      (iii) a tab having a tether hole;
   b) a compression spring; and
   c) a manual toggle mechanically coupled to and translating on the yoke linearly inward and outward relative to the socket providing,
      (i) an exterior tongue extending downward closing the gap in the circumferential lip of the latch body having a catch nib projecting inwardly located for seating into the latching notch in the opposite side edge of the docking base when the PDA is docked in the socket provided by the latch body, and
   d) cooperating mechanical means integral with the yoke and integral with the manual toggle for,
      (i) confining and compressing the spring between the yoke and toggle biasing the toggle to translate inward on the yoke relative to the socket, and
      (ii) resisting outward translation of the toggle on yoke relative to the socket, whereby, the toggle translates outward responsive to manual force pushing the toggle outward compressing the spring further and translates inward responsive to expansion force exerted by the compressed spring, and
   e) a tether fastened to the tether hole adapted to be fastened to a person using the PDA.

2. The tether and latch of claim 1 wherein the mating curvilinear circumferential lip of the socket provided by the latch body includes a tongue, sized and shaped to seat between raised lands defining a plug receptacle on a side face of the docking base of the PDA having contact surfaces for establishing electrical connections with electronic circuitry components of the PDA.

3. The tether and latch of claim 1 wherein the docking base of the PDA and the socket provided by the latch body each have a convex cross section in a reference plane oriented perpendicular to the docking base of the PDA, whereby, sideways and edgeways translation of the docking base seated within the socket of the latch body is precluded.

4. The tether and latch of claim 1 wherein the clocking base of the PDA includes a mechanical registry means for orienting and assuring proper insertion of the docking base into a receiving socket, and wherein the socket provided by the latch body includes a mechanical registration means cooperating with such mechanical registry means for precluding the docking base of the PDA from seating in the socket except in a particular orientation.

5. The tether and latch of claim 2 and further including a housing module enclosing electronic circuitry components designed to functionally cooperate with those of the PDA wherein the latch body forms a base of the housing module, and the tongue of the mating curvilinear circumferential lip of the socket provided by the latch body forms a cooperating plug having contact surfaces for establishing electrical connections with electronic circuitry components within the housing module, the respective contact surfaces of the plug receptacle and cooperating plug electrically connecting when the docking base is seated in the socket provided by the latch body.

6. The tether and latch of claim 1 wherein complete compression of the compression spring confined and compressed between the cooperating mechanical means of the toggle and yoke mechanically stops outward translation of the toggle on the yoke relative to the socket.

7. The tether and latch of claim 1 or 2 or 3 or 4 or 5 or 6 wherein the cooperating mechanical means of the yoke for confining and compressing the spring comprises, in combination,
   f) a pair of extending arms integral with the latch body defining the fitting gap and having tracking land on facing interior surfaces of the arms, the toggle being received between the pair of arms; and
   g) a retaining pin anchored between the extending arms proximate their ends; and
wherein the cooperating mechanical means of the toggle for confining and compressing the spring comprises, in combination therewith,
   h) integral reciprocal tracking lands on opposite exterior side faces of the toggle for receiving engaging and translating on the tracking lands on the facing interior surfaces of the extending arms of the yoke;
   i) an integral hexahedral thumb knob with a knurled top surface extending upward between and above the extending arms of the yoke having a spring cup penetrating into an exterior end face and having a retaining pin translation slot cut into exterior side faces of the knob perpendicularly intersecting the spring cup, the compression spring being received in the spring cup and being confined and compressed between the retaining pin anchored between the ends of the extending of the yoke and a bottom surface of the spring cup.

8. The tether and latch of claim 1 or 2 or 3 or 4 or 5 or 6 wherein the cooperating mechanical means of the yoke for confining and compressing the spring comprises in combination,
   f) planar tongue having integral tracking lands and tang at its tip oriented perpendicularly with respect to the tracking lands; and
   g) a spring port penetrating through the tang at the tip of the tongue for allowing introduction of the compression spring through the tang at the tip of the tongue; and
   h) means for mechanically closing the spring port; and
wherein the cooperating mechanical means of the toggle for confining and compressing the spring comprises, in combination therewith,
   i) a tray having knurled exterior side faces and reciprocal tracking lands on interior side faces of the tray for receiving, engaging and translating on the tracking lands of the planar tongue, such reciprocal tracking lands extending from an exterior base end of the tray toward a receiving spring retaining end of the tray opposite the exterior base end, the receiving spring retaining end of the tray being oriented generally perpendicularly with respect to the reciprocal tracking lands,
wherein the interior side faces of the tray are relieved proximate the receiving spring retaining end of the tray adapting it for receiving and translating onto the planar tongue with the perpendicular tang at its tip being received and moving within a spring channel volume defined by the interconnected tray and planar tongue, the compression spring being introduced into the spring channel volume via the spring port and confined, slightly compressed between the closed spring port and the receiving spring retaining end of the tray for urging the tray to translate inwardly on the planar tongue.

9. The tether and latch of claim 1 or 2 or 3 or 4 or 5 or 6 wherein the compression spring is helical defining a central cylindrical tube of a particular inner and outer diameter, and wherein the cooperating mechanical means of the yoke for confining and compressing the spring comprises in combination, f) a tracking land integral with the latch body; and g) a helically threaded rod hole penetrating into the latch body located proximate the tracking land having an axis oriented parallel to the tracking land;

h) a rod helically threaded at one end of a diameter less than the inner diameter of the central cylindrical tube of the compression spring and having a head at its opposite end of a diameter greater than the inner diameter of the central cylindrical tube of the compression spring, the helically threaded end of the rod sized to screw into and anchor in the threaded rod hole; and wherein the cooperating mechanical means of the toggle for confining and compressing the spring comprises, in combination therewith, i) a knob having knurled exterior side faces, a reciprocal tracking land integral with a top face for receiving engaging and translating on the tracking land of the latch body, a spring retaining cup penetrating into a front face of the knob having a diameter slightly greater than the larger of the diameters of the head of the rod and the outer diameter of the compression spring, and having a rod passageway penetrating into a rear face of the knob opposite the front face coaxially communicating through a bottom surface into the spring retaining cup, the rod passageway having a diameter greater than that of the rod and less than the outer diameter of the helical compression spring, wherein the reciprocal tracking land integral with the top face of the knob receives, engages and translates on the tracking land of the latch body, the rod is coaxially received through the cylindrical tube defined by the compression spring which in turn is coaxially received, confined and compressed in the spring retaining cup, the helically threaded end of the rod extending through the rod passageway being screwed into the helically threaded rod hole anchoring the toggle to the latch body, the compression spring compressed in the spring cup biasing the toggle to translate inwardly on the tracking land integral with the latch body.

* * * * *